United States Patent

Fischietto et al.

[11] Patent Number: 5,381,505
[45] Date of Patent: Jan. 10, 1995

[54] OPTICAL FIBERS WITH A LIGHT ABSORBING COATING

[75] Inventors: Frederick J. Fischietto, Folsom; Ralph E. Jones, Sacramento; Steven W. Wilcox; Mark S. Zetter, both of El Dorado Hills, all of Calif.

[73] Assignee: UOP, Des Plaines, Ill.

[21] Appl. No.: 174,094

[22] Filed: Dec. 28, 1993

Related U.S. Application Data

[63] Continuation-in-part of Ser. No. 104,515, Aug. 9, 1993.

[51] Int. Cl.$^6$ ............................................. G02B 6/22
[52] U.S. Cl. ............................................. 385/128; 385/123
[58] Field of Search ................. 385/128, 123–127, 385/141, 100, 144; 359/360; 65/3.12, 3.13, DIG. 16; 362/32; 126/652, 908; 428/615, 620, 650

[56] References Cited

U.S. PATENT DOCUMENTS

| | | | |
|---|---|---|---|
| 4,334,523 | 6/1982 | Spanoudis | 359/360 X |
| 4,372,648 | 2/1983 | Black | 385/127 |
| 4,637,686 | 1/1987 | Iwamoto et al. | 385/128 |
| 4,678,273 | 7/1987 | Vilhelmsson | 385/128 |
| 5,000,541 | 3/1991 | DiMarcello et al. | 385/128 |
| 5,062,687 | 11/1991 | Sapsford | 385/128 |
| 5,093,880 | 3/1992 | Matsuda et al. | 385/128 X |

OTHER PUBLICATIONS

"Optical Fiber Communications", B. K. Tariyal and A. H. Cherin, *Encyclopedia of Physical Science and Technology*, vol. 9, pp. 605–629 (1987). (no month).

"Optical Fibers, Drawing and Coating", L. L. Blyler, Jr. and F. V. DiMarcello, *ibid.*, pp. 647–657, (1987). (no month).

*Primary Examiner*—John D. Lee
*Assistant Examiner*—Phan Thi Heartney
*Attorney, Agent, or Firm*—Thomas K. McBride; Eugene I. Snyder

[57] ABSTRACT

Optical fibers having one or more polymeric coatings have been found to be sensitive to extraneous light arising either as incident light from outside the optical fiber or as light escaping the fiber at bends and being reflected back into the fiber by a coating acting as a secondary cladding. In either case the extraneous light intensity may be reduced by placing at least one light absorbing component in a coating. Where the light absorbing component is placed in a coating between the primary cladding of the optical fiber and the secondary cladding both sources of extraneous light may be reduced or eliminated. Particulate amorphous carbon is an effective light absorber because of the broad range of optical wavelengths absorbed and because of its efficiency of absorption (high extinction coefficient) over this range.

8 Claims, No Drawings

OPTICAL FIBERS WITH A LIGHT ABSORBING COATING

CROSS REFERENCE TO RELATED APPLICATIONS

This application is a continuation-in-part of our co-pending application, Ser. No. 08/045,515, filed Aug. 9, 1993, still pending all of which is hereby incorporated by reference.

BACKGROUND OF THE INVENTION

Wave guides have become familiar means to transmit high radio frequency signals, especially in the microwave region. More recent developments have made wave guides for the transmission of light rather commonplace. An optical fiber is a wave guide in which light is propagated by total internal reflection at the fiber boundaries. For the purpose of this application, "light" will refer to electromagnetic radiation in the ultraviolet, visible, and infrared ranges of the electromagnetic spectrum, which are approximately 200–400 nm, 400–800 nm, and 800–300,000 nm, respectively, extending through the far infrared range. The greatest use of optical fibers has been in communication and data transmission systems where light waves of a narrow wavelength are used as carriers via pulse or frequency modulation to transmit information. A less common but increasingly important application of optical fibers is for the transmission of analog information from a sensor to a remotely located detector which measures the intensity of the transmitted light over a range of wavelengths within the spectrum of light. For the purpose of this application the spectral range of greatest interest is that spanning the ultraviolet (ca. 200–400 nm), visible (ca. 400–800 nm) and near infrared (ca. 800–2500 nm).

The measurement of, for example, digital information differs significantly from that of analog information and imposes different requirements. Where digital information is transmitted along an optical fiber one is interested only in whether or not a signal is present, or more accurately whether light of a particular frequency is present at an intensity above some threshold value. Where analog information is transmitted along optical fibers one is interested in the absolute intensity of the signal at each wavelength of some extended portion of the light spectrum. Thus it becomes clear that where accurate transmission of analog information along an optical fiber is required it is necessary that both the wavelength and intensity of the transmitted light be preserved, that is, one can tolerate neither wavelength shifts nor intensity variation along the transmission path.

The principles of optical fibers are too well known to require extended discussion here. See, for example, "Optical Fiber Communications", B. K. Tariyal and A. H. Cherin, *Encyclopedia of Physical Science and Technology*, Vol. 9, pp 605–629 (1987); "Optical Fibers, Drawing and Coating", L. L. Blyler, Jr. and F. V. DiMarcello, ibid., pp 647–57. In brief, optical fibers have a core of plastic, glass, silica or other glassy transparent material with an outer, concentric layer called cladding which has a refractive index lower than the core. Where light injected into the core strikes the core-cladding interface at an angle of incidence greater than the critical angle there is total reflection, and since the angle of incidence equals the angle of reflection it follows that light will zigzag or spiral along the length of the core. Although in theory there should be no light loss, in practice attenuation occurs along the optical fiber because of the absorption by impurities within the core and because of scattering arising mainly from fiber imperfections such as non-uniform core diameter, bends in the fiber, and discontinuities at the core-cladding interface.

Optical fibers per se are delicate and fragile, and generally need to be protected by being sheathed with several concentric layers. In a variant of interest here the core of the optical fiber is coated during the drawing process with a thin layer of a tough polymer, such as a polyimide, to protect the delicate surface from scratching and marring, and to prevent microfracture. This is followed by another concentric layer of an elastic polymer, such as silicones, thermoplastic rubber compounds, urethanes or acrylates. Yet other coatings may be applied as protection from physical and chemical damage. It also should be noted that in another variant the cladding itself may be an elastic polymer. Of special interest is the case where the optical fiber comprises concentric layers of a glassy core of refractive index n, a glassy cladding of refractive index less than n, a polyimide coating, and a silicone coating. It needs to be emphasized that even though such an optical fiber is of special interest to us, our invention is not limited to such an optical fiber but is instead applicable to optical fibers generally.

We recently observed spurious signals in light transmitted along optical fibers under two quite different circumstances. In one case the intensity of light transmission varied with the intensity of ambient light external to the optical fiber. Thus, the light intensity measured at different wavelengths at the exit of an optical fiber varied with the intensity of external light. This implied that there was a significant amount of extraneous light from a source external to the fiber entering the core through the cladding along the length of the optical fiber, contrary to expectations. By "extraneous light" is meant light inserted into the core of an optical fiber through the cladding, in contradistinction to light injected directly into the core.

The second circumstance of spurious light transmission was noticed in an optical fiber having bends along its length and was manifested as selective attenuation at certain wavelengths. Further investigation showed that the wavelengths whose intensity were reduced corresponded to spectral absorption bands of a coating for the fiber. Evidently light was not totally reflected at the core-cladding interface at bends in the fiber but was reflected at the surface of other coatings acting as a secondary cladding. Thus light traversed the core-(primary)cladding interface, through one or more coatings external to the primary cladding where selective absorption occurred, was reflected at the interface with the secondary cladding back through the coatings it had already traversed where absorption occurred for a second time, and finally entered the core once more. In summary, light escaped the core, travelled through one or more layers of coatings, there to be selectively absorbed, and was reflected back into the core. Thus, light reentering the core corresponded, at least roughly, to the "absorption spectrum" of the traversed coatings and led to selective signal attenuation.

Once the nature of these problems was determined both were susceptible to a common solution. If any coating contained one or more components which efficiently absorbed the light entering the coating the problem could be expected to be effectively solved for the case of incident light. If the coating containing the light-absorbing component was placed between the primary cladding and the secondary cladding both problems would be solved. In fact, that turned out to be correct in the foregoing cases.

SUMMARY OF THE INVENTION

The purpose of this invention is to reduce or eliminate extraneous light entering the core of an optical fiber. An embodiment comprises the addition to a coating of at least one component absorbing light within the range of wavelengths traveling along the core of the optical fiber. In a more specific embodiment the component is charcoal in any of its forms. In a more specific embodiment charcoal is present in an amount from about 0.1 up to about 10 weight percent of the coating. In yet another embodiment the light absorbing component is added in an amount effective to absorb at least 90% of the extraneous light at least at those wavelengths of radiation injected into the core. In still another embodiment the optical fiber is coated with an elastic polymer containing at least one light absorbing component in an amount effective to absorb at least 90% of the offending extraneous light. Other embodiments will be apparent from the ensuing description.

DESCRIPTION OF THE INVENTION

This invention relates to optical fibers transmitting light, especially radiation in the ultraviolet-visible-near infrared-infrared portion of the light spectrum. For the purpose of this application, the light spectrum of greatest interest is between about 200 and about 30,000 nm, and more particularly from about 200 up to about 2500 nm. In the more usual case, the optical fiber of our invention will be transmitting light of only a limited wavelength range within the foregoing spectrum, and in fact the more relevant parameter is the range of wavelengths whose intensity is measured at the exit of the optical fiber, irrespective of the range of wavelengths travelling within the fiber. The wavelength range $\Delta$ will in this application represent the wavelength range measured at the exit of the optical fiber and usually, although not necessarily, also will correspond to the wavelength range of the light being transmitted along the optical fiber. It should be clear that only light of wavelengths within $\Delta$ are of importance in our invention. We previously have defined "extraneous" light as that entering the core of an optical fiber through the primary cladding. By "offending" light is meant extraneous light within the wavelength range $\Delta$ as that term is defined above.

It also should be explicitly recognized that material constraints place limitations on spectral range which only reflect practical limitations. Thus, most quartz fibers transmit light only up to about 2500 nm. Optical fibers of zirconium fluoride can carry light of wavelength up to ca. 4000 nm. Chalcogenide fibers may extend that range to about 14,000 nanometers. Thus, the limitations in materials available as optical fibers place constraints on the spectral range of light carried by the fiber.

The optical fibers of our invention have at least one and usually several coatings arranged concentrically around the cladded core. In at least some cases one or more of the coatings also act as a secondary cladding, reflecting light which escapes from the core through the primary cladding back into the core. The coatings generally are organic polymers, some of which may be elastic polymers. As previously stated, we have observed that under some conditions there is extraneous light, which includes both 1) the case where the extraneous light is ambient light entering from outside the fiber and 2) the case where extraneous light is light which escapes from the core via scattering and via loss of total internal reflection at bends in the fiber and is reflected from a coating acting as a secondary cladding. What is necessary is to prevent the extraneous light which has entered any coating external to the primary cladding from entering, or reentering, the core of the optical fiber.

The extraneous light which has entered a coating is prevented from getting into the core of the optical fiber by having present in the coating a light absorbing component. It is only necessary that this component absorb light within the wavelength range $\Delta$ since only that range of wavelengths is being measured, or transmitted and measured. The light absorbing component is present in an amount such that it absorbs at least 90% of the offending radiation, although it is preferable that it absorbs at least 95%, and yet more preferable that it absorbs at least 99%, or substantially all, of the offending radiation. One light absorbing component which is particularly desirable is particulate amorphous carbon, in all of its various forms, because it is effective to absorb radiation over a very broad range of the spectrum of interest. By "particulate amorphous carbon" is meant charcoal in all of its various forms and however it may be referred to, such as decolorizing carbon, lamp black, carbon black, activated carbon, activated charcoal, and so forth. It needs to be understood that the success of our invention does not depend on the nature or source of the particulate amorphous carbon used, but rather on the fact that we use particulate amorphous carbon dispersed throughout the polymeric coating. When particulate amorphous carbon is used it may be employed in a concentration as little as about 0.1 weight percent up to as high as about 10 weight percent of the coating. However, it should be recognized that some polymer properties may be adversely affected (for example, strength loss) with increasing concentrations of carbon black. Consequently, it is more preferable that particulate amorphous carbon concentrations do not exceed 5 weight percent, and even more preferable that concentrations do not exceed about 2 weight percent. It also should be clear that many other light absorbing components may be used. In particular, other dyes may be used which are effective light absorbers over more or less narrow ranges of the light spectrum. This variant may be particularly useful when problems arise in only a very narrow and limited range of the light spectrum, for in those cases the light absorbing component may be carefully chosen to correspond to the problem areas within the spectrum.

The identity of the coating is not of particular importance and it is known that a rather broad range of materials are presently used. Examples of suitable elastic polymers as coatings include silicones, acrylates, urethanes, and rubbers, whether thermally cured or ultraviolet cured. Examples of hard polymeric coatings include polyimides, polyacrylates, and so forth.

As stated above the most generally effective placement of the coating containing the light absorbing component(s) is between the primary and the secondary claddings, for with such placement extraneous radiation from both an external source as well as from failure of total internal reflection can be absorbed. Where only radiation from an external source is a problem the coating containing the light absorbing component(s) may be located anywhere external to the primary cladding.

The foregoing description was couched in terms of discrete fibers. However, in many uses fibers are bundled to afford an ensemble with each fiber core carrying its own discrete spectrum of radiation. In such cases having on each fiber a coating which contains the light absorbing components of our invention also can be expected to be useful, especially in preventing "crosstalk" between adjacent fibers. It should be clear that our invention encompasses this variation as well.

The following examples illustrate our invention but are not intended to limit it in any way.

EXAMPLE 1

Extraneous light via secondary cladding. An optical fiber was drawn from a commercially available preform, coated with a thermally cured polyimide (from DuPont) and sheathed in a thermally cured silicone. The fiber was used to transmit light in the 1000–2300 nm range, and intensity measurements were made on various coils of fiber of different bend radius vs. unbent fiber as a reference. Significant attenuation was noticed at wavelengths corresponding to absorption peaks of the polyimide. Absorption varied with the bend radius, further supporting the view that light leaks from the core of the bent fiber, i.e., it escapes from the core because of failure of total internal reflection. The leaked light internally reflects off the silicone sheath acting as a secondary cladding after being absorbed by the polyimide, and is absorbed again by the polyimide before reentering the core of the fiber.

EXAMPLE 2

Extraneous light via ambient light. The basic optical fiber was the same as described above with a polyimide coating and was 500 microns in diameter. Spectra of chloroform were obtained at various wavelengths in the 1000–2100 nm range using as the fiber on the source side of the analyzer, i.e., fiber transmitting light to the sample, one having a thermally cured silicone sheath, an ethylene-tetrafluoroethylene copolymer (Tefzel from DuPont) jacket, a Kevlar TM braid, and an outer Tefzel jacket, with the jacketed fiber wrapped in aluminum foil. The detector side of the analyzer was connected to 6 meters of different fibers, one being a bare fiber (only polyimide coated) and the other also having a silicone sheath containing 1 weight percent carbon black. The latter were coiled, covered with aluminum foil from their connection points to the coil, and placed in an aluminum foil lined box. Scans of chloroform in a 50 mm cuvette were obtained, both with the coils illuminated by a 100 W bulb held 7 inches from the coil and without illumination. Table 1 gives the difference (in absorbance units, AU) in light transmission at 4 points. Since chloroform is virtually opaque at these wavelengths under the foregoing path length, these are quite sensitive measurements for stray light.

TABLE 1

| Fiber | Effect of Ambient Light AU Difference | | | |
|---|---|---|---|---|
| | 1151 nm | 1408 nm | 1679 nm | 1860 nm |
| Bare | 0.0441 | 0.0947 | 0.1891 | 0.2478 |
| Silicone + 1% C | 0.0004 | 0.0011 | 0.0014 | 0.0008 |

The foregoing data show both that light from an external source enters the core through the coatings, and that the addition of carbon to a silicone coating effectively absorbs the extraneous radiation over the measured wave length region.

What is claimed is:

1. In an optical fiber transmitting radiation along the core of said fiber, at least a portion of said transmitted radiation being in the wavelength range between about 200 and about 30,000 nanometers, the improvement comprising providing said optical fiber with a first coating of organic polymers containing a particulate amorphous carbon in an amount effective to absorb at least 99% of the radiation within said wavelength range entering said first coating.

2. The improved optical fiber of claim 1 where said first coating of organic polymers is interposed between a primary cladding and a second coating acting as a secondary cladding.

3. The improved optical fiber of claim 1 where the transmitted radiation is of a wavelength between about 200 and about 2500 nanometers.

4. The improved optical fiber of claim 1 where said first coating of organic poloymers acts as a secondary cladding.

5. An optical fiber transmitting radiation, at least a portion of which is within the wavelength range between about 200 and about 30,000 nanometers, said optical fiber comprising concentric layers of:
 a) a glassy core of refractive index n;
 b) a glassy cladding of refractive index less than n;
 c) a polyimide coating; and
 d) a silicone coating containing a particulate amorphous carbon in an amount which absorbs at least 99% of the radiation within said wavelength range entering said silicone coating.

6. The optical fiber of claim 5 where the radiation transmitted is of a wavelength between about 200 and about 2500 nanometers.

7. An optical fiber transmitting radiation, at least a portion of which is within the wavelength range between about 200 and about 30,000 nanometers, comprising concentric layers of:
 a) a core of refractive index n;
 b) a primary cladding of refractive index less than n;
 c) a secondary cladding of refractive index less than n;
 d) a coating of organic polymers containing a particulate amorphous carbon in an amount which absorbs at least 99% of the radiation within said wavelength range entering said coating, where said coating is either i) the secondary cladding of c) or ii) interposed between the primary cladding of b) and the secondary cladding of c).

8. The optical fiber of claim 7 where the transmitted radiation is of a wavelength between about 200 and about 2500 nanometers.

* * * * *